(12) United States Patent
Bauer et al.

(10) Patent No.: US 12,486,409 B2
(45) Date of Patent: Dec. 2, 2025

(54) PARTICULATE FILLER, PREPARATION AND USE THEREOF

(71) Applicant: Merck Patent GmbH, Darmstadt (DE)

(72) Inventors: Johann Bauer, Darmstadt (DE); Manfred Parusel, Darmstadt (DE)

(73) Assignee: Susonity Commercial GmbH, Gernsheim (DE)

( * ) Notice: Subject to any disclaimer, the term of this patent is extended or adjusted under 35 U.S.C. 154(b) by 802 days.

(21) Appl. No.: 17/779,634

(22) PCT Filed: Nov. 27, 2020

(86) PCT No.: PCT/EP2020/083569
§ 371 (c)(1),
(2) Date: May 25, 2022

(87) PCT Pub. No.: WO2021/105319
PCT Pub. Date: Jun. 3, 2021

(65) Prior Publication Data
US 2023/0018717 A1    Jan. 19, 2023

(30) Foreign Application Priority Data

Nov. 29, 2019   (EP) ..................................... 19212432

(51) Int. Cl.
*C09D 5/24*       (2006.01)
*C08K 9/02*       (2006.01)
(Continued)

(52) U.S. Cl.
CPC .................. *C09D 5/24* (2013.01); *C08K 9/02* (2013.01); *C09C 1/405* (2013.01); *C09C 1/407* (2013.01);
(Continued)

(58) Field of Classification Search
CPC ... C09D 5/24; C09C 3/063; C09C 2200/1004; C09C 2200/1008; C09C 2200/1041; C08K 2003/2227; C08L 83/04; C01P 2004/84
See application file for complete search history.

(56) References Cited

U.S. PATENT DOCUMENTS 5,702,519 A     12/1997  Nitta et al.
5,945,035 A *   8/1999   Vogt .......................... H01B 1/20
                                                                    423/71
(Continued)

FOREIGN PATENT DOCUMENTS

CN    101360794 A    2/2009
DE    19647539 A1    5/1998
(Continued)

OTHER PUBLICATIONS

International Search Report PCT/EP2020/083569 dated Feb. 24, 2021 (pp. 1-2).
(Continued)

*Primary Examiner* — Matthew E. Hoban
*Assistant Examiner* — Lynne Edmondson
(74) *Attorney, Agent, or Firm* — Csaba Henter; MILLEN, WHITE, ZELANO & BRANIGAN

(57) ABSTRACT

The present invention relates to a particulate filler which has a coating on support particles in each case surrounding the latter, which comprises a titanium dioxide doped with niobium and at least one further element, to a process for the preparation of a particulate filler of this type and to the use thereof, in particular as varistor filler having nonlinear electrical properties in coating compositions and moulding compounds.

20 Claims, 12 Drawing Sheets

Figure 1:
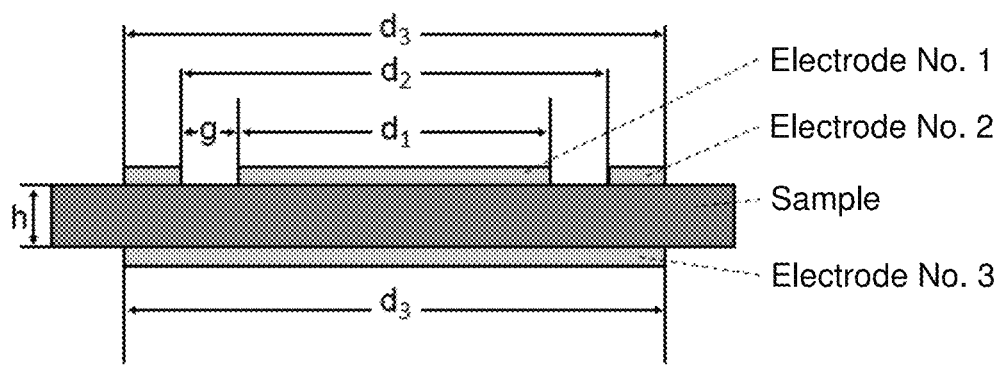
Figure 1:
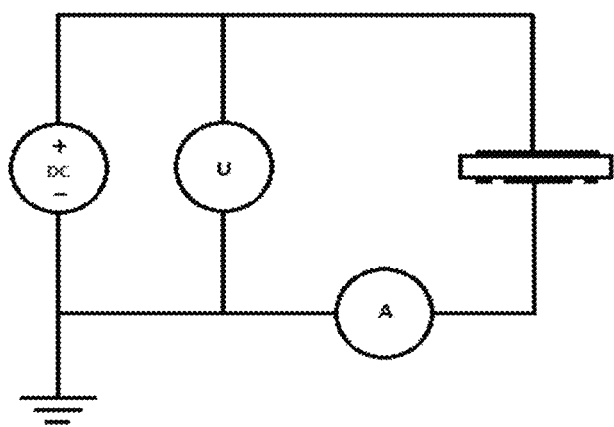

(51) Int. Cl.
| | |
|---|---|
| *C08L 83/04* | (2006.01) |
| *C09C 1/40* | (2006.01) |
| *C09C 3/06* | (2006.01) |
| *C09D 7/40* | (2018.01) |
| *C09D 7/62* | (2018.01) |
| *C09D 123/06* | (2006.01) |
| *C09D 163/00* | (2006.01) |
| *C09D 183/04* | (2006.01) |

(52) U.S. Cl.
CPC ............ *C09C 3/063* (2013.01); *C09D 7/62* (2018.01); *C09D 7/70* (2018.01); *C09D 123/06* (2013.01); *C09D 163/00* (2013.01); *C09D 183/04* (2013.01); *C01P 2004/20* (2013.01); *C01P 2004/32* (2013.01); *C01P 2004/61* (2013.01); *C01P 2004/84* (2013.01); *C01P 2006/40* (2013.01); *C08K 2201/001* (2013.01); *C08K 2201/005* (2013.01)

(56) References Cited

U.S. PATENT DOCUMENTS

| | | | |
|---|---|---|---|
| 6,124,549 A | | 9/2000 | Kemp et al. |
| 6,162,374 A | * | 12/2000 | Schoen ................. C09C 1/0015 252/511 |
| 7,868,732 B2 | | 1/2011 | Hoidis et al. |
| 7,988,780 B2 | | 8/2011 | Bluemel et al. |
| 9,403,996 B2 | | 8/2016 | Rueger et al. |
| 10,040,963 B2 | | 8/2018 | Rueger et al. |
| 2010/0322981 A1 | | 12/2010 | Bujard et al. |
| 2013/0089707 A1 | | 4/2013 | Faure |
| 2019/0351622 A1 | | 11/2019 | Nishimagi et al. |

FOREIGN PATENT DOCUMENTS

| | | |
|---|---|---|
| DE | 102007005477 A1 | 8/2007 |
| DE | 102010052888 A1 | 6/2012 |
| EP | 0763573 A2 | 3/1997 |
| EP | 2020009 B1 | 12/2012 |
| JP | S62117304 A | 5/1987 |
| JP | 2011504193 A | 2/2011 |
| JP | 2011096455 A | 5/2011 |
| WO | 1997026693 A1 | 7/1997 |
| WO | 2015067337 A1 | 5/2015 |
| WO | 2018095834 A1 | 5/2018 |

OTHER PUBLICATIONS

Office Action in corresponding China application 202080082622.7 dated Nov. 15, 2023 (pp. 1-7).

Hy Li et al."Influence of (Nb, Ce, Si, Ca) Doping on the Electrical Properties of TiO2-based Varistor Ceramics", Journal of Functional Materials. 2002, 33(6), 635-637.

C. Yang et al."Disappearance and recovery of colossal permittivity in (Nb+Mn) co-doped TiO2", Ceramics International. 2018, 44(11), 12395-12400.

J.R. Sambrano et al "An Ab Initio Study of Oxygen Vacancies and Doping Process of Nb and Cr Atomson TiO (110) Surface Models", International journal of quantum chemistry. 1997, 65(5), 625-631.

* cited by examiner a)

b)

a)

b)

PARTICULATE FILLER, PREPARATION AND USE THEREOF

The present invention relates to a particulate filler which has a coating on support particles in each case surrounding the latter, which comprises a titanium dioxide doped with niobium and at least one further element, to a process for the preparation of a particulate filler of this type and to the use thereof, in particular as varistor filler having nonlinear electrical properties in coating compositions and moulding compounds.

Coating compositions or moulding compounds which consist, for example, of silicones, EPDM (ethylene-propylene-diene monomer), polyurethanes, polyethylenes, epoxides, phenolic resins or ceramic materials and comprise certain functional fillers are employed, for example, in various application forms in high-voltage technology in order to control the electric fields occurring there. The aim of the use of these functional fillers is controlled field control or also overvoltage protection in the application medium. The functional fillers employed for this purpose are also known as varistors ("variable"+"resistor"). They are characterised in that their electrical conductivity in the application medium is dependent on the applied field strength, i.e. occurs in a nonlinear manner.

Such fillers are particularly suitable for use in application media and protection of the materials used there, in which high constant or variable field strengths occur.

Typical areas of use here are field control in high-voltage cables, for the connection of which to one another, for example in muffs or also at terminals, the main insulation is removed and large field-strength gradients build up at the interfaces of electrically conductive and insulating components (electrical stress) or alternatively also for overvoltage protection against transient loads, such as switching voltages, lightning strikes or discharges. Further areas of use also consist in the field control of encapsulation compositions and contacts of circuits in high-power electronics.

Application media filled with varistor materials, for example polymers, exhibit both properties of resistive field control and also of capacitive field control. These materials are therefore suitable both for use in direct-voltage applications and also in alternating-voltage applications and are also able to absorb transient events (pulses). The reason for this lies in a well-controlled drop in voltage between the high-voltage source (for example a cable) and the earth (for example outer conductor) via the varistor-filled application medium. Owing to the nonlinear electrical properties of the varistor material (conductivity) the electric field is homogenised (resistive field control) and at the same time, due to the increased dielectric constant of the application medium owing to the presence of the varistor material together with low loss (tan δ), the field-strength distribution is broadened (capacitive field control).

The nonlinear electrical properties of varistor materials were already utilised some decades ago for the protection of electrical systems, for example in the form of sintered ceramics, which comprised SiC or ZnO as varistor materials and were employed for the protection of telephone systems. Other varistor materials, often in the form of particles of various shapes and sizes, have also already been described, for example particles of titanium carbide, titanium suboxide (TiO) or conductive particles of copper or carbon black.

Thus, for example, WO 97/26693 A1 discloses the incorporation of comminuted zinc oxide particles as microvaristors into polymer compositions of various composition with a concentration of 25-50% in order to effect a shift to higher switching-field strengths in the application medium and thus to reduce the likelihood of electrical failure. However, the materials produced here still have comparatively high electrical conductivity.

EP 2020009 B1 describes overvoltage protection means for electronic components and circuits which contain microvaristor particles comprising a multiplicity of possible materials, such as doped zinc oxide, tin oxide, silicon carbide or strontium titanate, arranged in a defined manner in a monolayer or chain.

DE 102010052888 A1 discloses varistor particles which have a conductive layer consisting of an antimony-doped tin oxide in defined composition on a flake-form substrate, such as, for example, mica.

The varistor materials used in the prior art have various disadvantages. Thus, for example, SiC microparticles are extremely hard, which makes comminution of the material more difficult and leads to high abrasiveness of the particles in the application medium and in the processing process. In addition, micronised SiC particles tend towards oxidation of their surface, which adversely affects their electrical properties.

Zinc oxide has an extraordinarily high density of 5.5 to 6.5 $g/cm^3$, depending on the degree of compaction achieved by the sintering process. Since the density of the varistor particles is significantly greater than the density of the application medium, these varistor particles have a great tendency to sediment as early as during preparation of the mixtures with the application medium, which makes homogeneous and durable mixing of the materials more difficult. The irregular composition of the application medium correspondingly leads to irregularities in its electrical properties.

Overall, there therefore continues to be a demand for fillers having varistor properties which exhibit pronounced nonlinear electrical properties and positive material properties and can be introduced mechanically into various application media easily and homogeneously without exhibiting sedimentation behaviour.

The object of the present invention therefore consists in providing a filler having varistor properties which can be introduced into a wide variety of application media easily and in stable mixture, can be controlled in its composition in such a way that it can be adapted optimally to the respective requirements of the application medium, exhibits reliable nonlinear electrical behaviour and can be employed both in direct-current applications and in alternating-current applications.

A further object of the invention consists in providing a process for the preparation of a filler of this type.

In addition, an additional object of the invention consists in indicating the use of a filler of this type.

The object of the present invention is achieved by a particulate filler which consists of support particles and a coating in each case surrounding the support particles, where the support particles comprise or in each case consist of at least one aluminium compound or silicon compound and the coating comprises a titanium dioxide doped with niobium and at least one further element.

The object of the invention is likewise achieved by a process in which support particles which comprise or in each case consist of at least one aluminium compound or silicon compound are provided with a coating comprising at least one titanium compound, at least one niobium compound and at least one compound of a further element in aqueous suspension at a pH which is suitable in each case, and in which the support particles provided with the coating are subsequently dried and calcined, during which the coating is converted into a titanium dioxide in granular form which is doped with niobium and at least one other element.

In addition, the object of the invention is also achieved by the use of a particulate filler of this type for the pigmentation of coating compositions and moulding compounds, where the coating compositions and moulding compounds produced in this way are provided with nonlinear electrical properties.

The present invention therefore relates to a particulate filler which has on certain support particles a coating which effects electrically semiconductive or electrically conductive behaviour of the filler in the application medium. It has proven advantageous to prepare fillers having desired varistor properties from materials of various composition. In the case of a procedure of this type, material properties such as hardness, density, size, shape and ultimately semiconducting or conductive properties of the varistor fillers can be controlled better and can often also be adjusted more specifically than could be the case for particulate fillers of homogeneous composition.

Thus, materials which have proven advantageous for the support particles of the fillers according to the invention are, in particular, those which comprise or in each case consist of at least one aluminium compound or silicon compound. Particularly suitable aluminium compounds which come into consideration here are aluminium oxide ($Al_2O_3$) or natural and synthetic aluminosilicates of various composition. A particularly suitable silicon compound is silicon dioxide ($SiO_2$), which can be employed in crystalline form and particularly preferably in amorphous form, for example as kieselguhr.

Materials which consist of or comprise aluminosilicates are, for example, mullite, fly ash, kaolinite, pumice stone or perlite. All these materials are very highly suitable as support material for the particulate fillers of the present invention since they have, owing to their natural composition or owing to particular processing processes, a very low density and an advantageous size and shape and can be coated well. In some cases, they are readily and inexpensively available as natural materials or waste products from large-scale industrial processes.

Mullite and fly ash can particularly preferably be employed.

The support particles for the particulate fillers according to the invention can have various shapes. In view of the later application media and their specific requirements, flake-form or spherical support particles are particularly suitable, or alternatively also support particles which have an isotropically irregular shape.

Spherical support particles are taken to mean those which are in the shape of a solid sphere, in the form of a hollow sphere or in the form of a spheroidal body which does not have a perfectly geometrical sphere shape and can be formed as a solid body or alternatively as a hollow body. It is in the nature of the above-mentioned materials that geometrically perfect spheres can only be produced in the rarest cases, i.e. spheroidal shapes predominate for technical reasons.

In accordance with the invention, the term isotropically irregular is applied to all granular particles in which a preferential axis cannot be determined optically, but which have an approximately equal or similar diameter in all spatial directions and can have side surfaces. Such particles are also generally referred to as granules.

In accordance with the invention, flake-form support particles are advantageously in the form of aluminium oxide flakes, which either consist of pure aluminium oxide ($Al_2O_3$) or, besides aluminium oxide, comprise foreign fractions of further metal oxides in a proportion of 0.1 to 10% by weight, preferably from 0.1 to 5% by weight, based on the weight of the support particles.

These are the oxides or oxide hydrates of Ti, Sn, Si, Ce, Ca, Zn, In and/or Mg. Preference is given to the use of $Al_2O_3$ support particles which, besides $Al_2O_3$, also comprise 0.1 to 5% by weight, based on the weight of the support particles, of $TiO_2$.

Flake-form $Al_2O_3$ support particles of this type can be obtained, for example, by the process disclosed in EP 763 573 A2. Corresponding products in suitable particle sizes are also commercially available.

Flake-form support particles are particularly suitable as starting materials for particulate fillers in accordance with the invention that are intended to be employed in thin layers on substrates or in thin-walled components, for example in resin or paint layers on insulators, bushings, electrical conductors or on internal fittings in electrical machines, such as transformers, generators and motors. Since the particulate fillers retain the flake shape of the starting support particles, they are able to align well laterally in the thin layers of such applications and thus form the requisite conduction tracks when required.

The support particles consisting of or comprising aluminosilicates (general formula $Al_xSi_yO_z$; x, y and z variable) are, in particular, the above-mentioned materials, which are natural degradation products or are available inexpensively in large amounts as waste products of large-scale industrial processes or as synthetic products. Corresponding products are already being employed as aggregates, for example in the construction industry. Fly ash and mullite are particularly preferably used as starting materials for the support particles of the fillers in accordance with the present invention, since they are already available in the desired form, frequently and preferably as spherical hollow bodies, and in the desired particle size. All other materials mentioned can, where necessary, be brought to the requisite particle size by conventional grinding processes.

Amorphous silicon dioxide particles are also available on a large industrial scale, for example as kieselguhr.

The (regular or irregular) isotropic shape of the materials mentioned here also carries over to the shape of the particulate fillers generated therefrom. The latter are preferably employed in moulding compounds, which are employed in voluminous form, for example for the production of cable muffs, insulators, bushings or cable terminals. These products are frequently produced by the injection moulding process, in some cases directly at the site of use. It is therefore of great importance that the volume polymers employed here (silicones, epoxides, polyethylenes, polyurethanes, EPDM, etc.) have suitable rheological properties for carrying out the injection-moulding process in spite of the addition of the particulate fillers. Flake-form particles may adversely influence the flow behaviour of the injection-moulding compound here, meaning that isotropic particles, which do not adversely influence the flow behaviour of the pigmented volume polymers, or only do so to a small extent, are preferred for these areas of application. In addition, the very low density of some of these support materials has a particularly advantageous effect on the sedimentation tendency of the particulate fillers in the application medium.

In accordance with the invention, the density of the particulate fillers according to the present invention is in the range from 1.5 to 4.5 $g/cm^3$, preferably in the range from 1.5 to 3.0 $g/cm^3$ and in particular in the range from 1.5 to 2.5 $g/cm^3$. It is composed of the average of the densities of support particles and coating and can in each case be matched to the requirements in the application medium through the corresponding choice of material, in particular of the support particles.

The support particles of the particulate filler according to the invention are in each case surrounded by a coating which comprises a doped titanium dioxide which is doped with niobium and at least one further element. The coating here surrounds each support particle individually and is in separate form thereon, i.e. does not form a coherent phase around a plurality of support particles.

In accordance with the invention, the further element is at least one element selected from the group consisting of Mn, Cr and Ce.

The doping preferably takes place in the combinations:
Nb, Mn;
Nb, Mn, Cr;
Nb, Mn, Ce;
Nb, Cr;
Nb, Cr, Ce
Nb, Ce; or
Nb, Mn, Cr, Ce,
where the combinations Nb, Mn, Ce and Nb, Cr are particularly preferred.

The doping elements are in cationic form in the $TiO_2$ crystal lattice or are located at the particle boundaries of the titanium dioxide granules.

The doping in the titanium dioxide is in each case present in an amount of 0.01 to 5 atom-%, based on the number of the sum of Ti atoms and atoms of the doping elements. The proportion of the doping elements (totality of the doping elements) is preferably at a content of 0.02 to 2 atom-%.

While niobium determines the electrical conductivity of the filler in the application medium and manganese or chromium determines the steepness of the nonlinear character of the conductivity, additional doping with cerium can lead to nonlinear electrical conductivity in the application medium being shifted to higher field strengths.

The coating on the support particles of the filler according to the invention preferably consists of multi-doped titanium dioxide which is in the form of granules on the surface of the support particles, where it forms a substantially continuous, granular layer.

The coating on the support particle in each case has a geometrical thickness in the range from 100 to 5000 nm, preferably from 150 to 4000 nm and in particular from 200 to 2000 nm. The geometrical layer thickness of the coating can easily be determined by means of conventional measurement methods with reference to cross-section images (Ar ion beam) of individual particles of the particulate filler.

The average particle size $d_{50}$ of the particulate filler according to the invention is in the range from 1 to 150 µm, preferably from 2 to 100 µm and in particular 5-50 µm. Due to the origin of the above-mentioned support materials of isotropic shape, the particle sizes of the individual filler particles can vary in a comparatively broad range, meaning that often only the quoting of the volume-related average particle size $d_{50}$ appears sensible here. A certain variation latitude of the particle size of the individual particles is generally also present on use of flake-form support particles.

The particle size of the particulate filler and, where appropriate, of the support particles is preferably determined via a laser diffraction method, which is generally familiar and has the advantage of also being able to determine the particle size distribution of the particles. For the fillers according to the invention and the support particles thereof, the particle sizes have been determined using a Malvern Mastersizer 3000, APA 300 (product from Malvern Instruments, Ltd., UK).

The present invention also relates to a process for the preparation of a particulate filler as described above, in which support particles which comprise or in each case consist of at least one aluminium compound or silicon compound are provided with a coating which comprises at least one titanium compound, at least one niobium compound and at least one compound of a further element in aqueous suspension at a pH which is suitable in each case.

In general, the compounds of niobium and of the other doping elements are water-soluble or acid-soluble compounds which are employed in the coating process in this dissolved form and in an amount selected corresponding to the degree of doping. It should be noted here that, for precipitation of the oxide hydrates of the corresponding elements onto the surface of the support particles, successive setting of a number of different pH values is necessary under certain circumstances. Usual pH values are in the acidic to neutral range from pH 2 to pH 7. When all precursor compounds have deposited on the surface of the support particles in a coating, the coated support particles are subsequently dried and calcined. On calcination temperatures in the range from 850 to 1300° C., fine granules of titanium dioxide doped with niobium and at least one further element form on the surface of the support particles.

Corresponding to the details already described above, the support particles employed in the process according to the invention are preferably flake-form, spherical or have an isotropically irregular shape and comprise or in each case consist of aluminium oxide, silicon dioxide or an aluminosilicate.

The support particles employed preferably consist of aluminium oxide, silicon dioxide, mullite, fly ash, kaolinite, pumice stone or perlite, and very particularly preferably consist of mullite or fly ash.

The latter have an isotropic particle shape and, due to the at least partial presence of isotropic hollow bodies, an advantageously low density, which predestines the fillers generated therefrom for use in volume polymers in particular. The low density of these support materials of <2 g/cm³ facilitates particularly good matching of the overall density of the particulate fillers according to the invention to the density of the polymeric application medium, so that separation of the composite during the pot life or during crosslinking in the application case can be avoided. This means that sedimentation of the filler, with the consequent disadvantages, such as gradient formation in the application medium and consequently uneven electrical properties of the resultant workpiece, can easily be avoided, which is only achieved with excessive equipment complexity in the case of fillers of higher density.

Details on the doping elements and their advantageous combinations have already been described above. To this extent, reference is made here thereto. This likewise applies to all details with respect to shape, size and density of the support particles and geometrical thickness and composition of the coating.

The present invention also relates to the use of a particulate filler in accordance with the above description for the pigmentation of coating compositions and moulding compounds, in particular with the objective of providing these coating compositions and moulding compounds with nonlinear electrical properties, i.e. acting as varistor filler.

The corresponding unfilled coating compositions or moulding compounds generally comprise or consist of silicones, EPDM, polyurethanes, polyethylenes, epoxides, phenolic resins or a ceramic material as principal constituent.

Depending on the application medium and requisite electrical properties, the particulate filler according to the invention is present in the coating composition or moulding compound with a pigment volume concentration in the range 3-33% by vol., preferably 3-25% by vol. and in particular 4-20% by vol., based on the (solids) volume of the coating composition or moulding compound.

Although the determination of the mass proportion of a filler in an application medium (pigment mass concentration PMC) can be carried out easily, for better comparability of different systems the pigment volume concentration PVC is frequently determined in practice. Since the fillers have different densities, they occupy different volumes in the application medium for the same weight introduced. In particular in the case of the percolating particle systems described here, particle-particle contacts, particle sizes and their size distribution and particle geometries essentially determine the electrical properties of the resultant composite materials. The effect of a specific varistor filler is therefore best described by comparison of pigment volume concentrations.

Pigment mass concentration PMC and pigment volume concentration PVC are defined as follows (the volatile components are not taken into account in both cases):

$$PMC = \frac{m(\text{filler})}{m(\text{filler}) + m(\text{binder})}$$

$$PVC = \frac{V(\text{filler})}{V(\text{filler}) + V(\text{binder})}$$

$$= \frac{m(\text{filler})/d(\text{filler})}{\left(m(\text{filler})/d(\text{filler})\right) + \left(m(\text{binder})/d(\text{binder})\right)}$$

$m$ = mass, $d$ = density, $V$ = volume

The particulate fillers in accordance with the present invention have nonlinear electrical properties, i.e. varistor properties, in the coating composition or moulding compound of the application medium. Due to the possibility of selecting various support particles which, besides different shape and size, may also have different densities, and due to the possibility of variation in the type and amount of the doping of the coating on the respective support particles, both the electrical properties and also the density of the particulate fillers can be matched optimally to the respective requirements of the application medium. All starting materials here are readily available and the preparation of the particulate fillers by means of an uncomplicated coating process can be carried out without major technical effort. The particulate fillers according to the invention can be employed in direct-current and alternating-current applications and achieve high switching field strengths of >3000 kV/m. In the ground state, the electrical conductivity of the particulate fillers according to the invention substantially corresponds to the electrical conductivity of the insulating materials surrounding them, meaning that unintended generation of an electrical conductivity under non-stress conditions does not have to be expected. On switching through in the stress case, by contrast, a change in the measured current density in the coating composition or moulding compound over several orders of magnitude is possible. The increased current density here stands for the changed nonlinear conductivity of the composite.

FIG. 1: shows the diagrammatic circuit of the measurement arrangement (1b, bottom) with voltage source (DC), integrated voltage measurement (U), pico-ammeter (A) and test specimen, and the test specimen with the relevant dimensions (1a, top).

Figure 2:
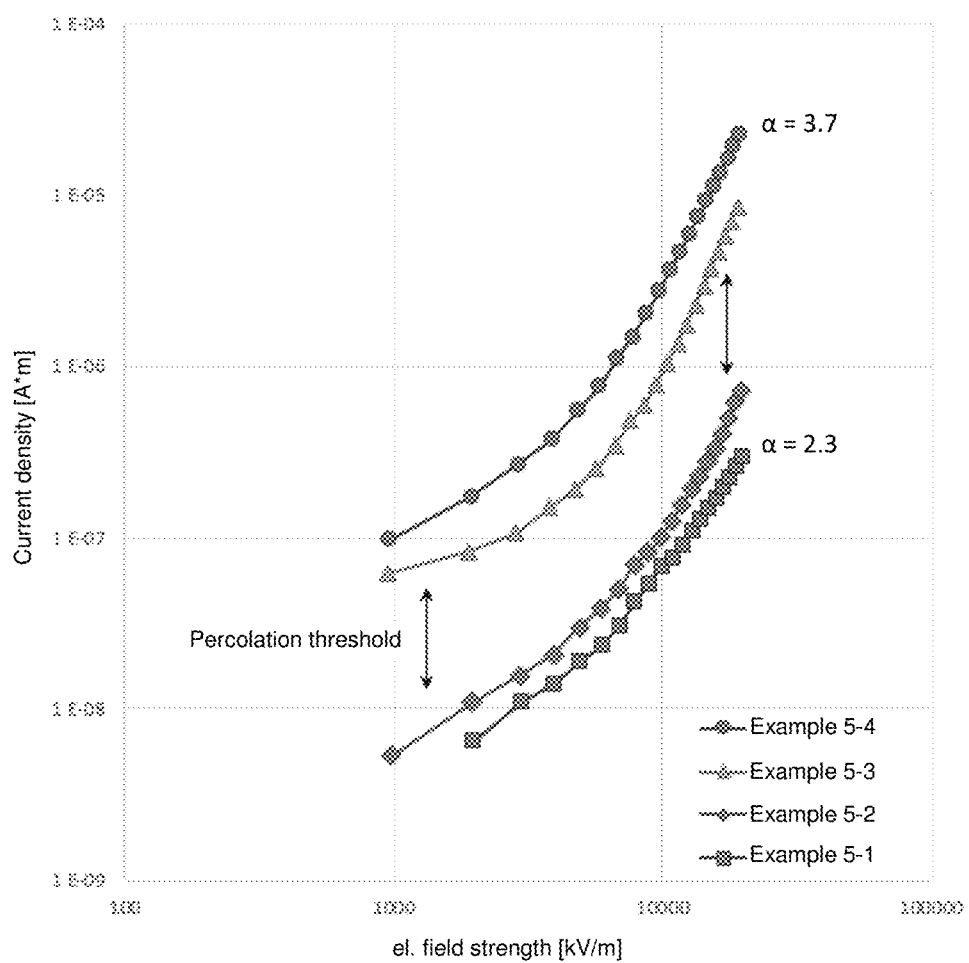

FIG. 2: shows the characteristic DC field strength/current density curve (E/J) of a filler in accordance with Example 1 in RTV-2 silicone with pigment mass concentrations of 15, 20, 25 and 30%. The percolation threshold is marked (Examples 5-1 to 5-4).

Figure 3:
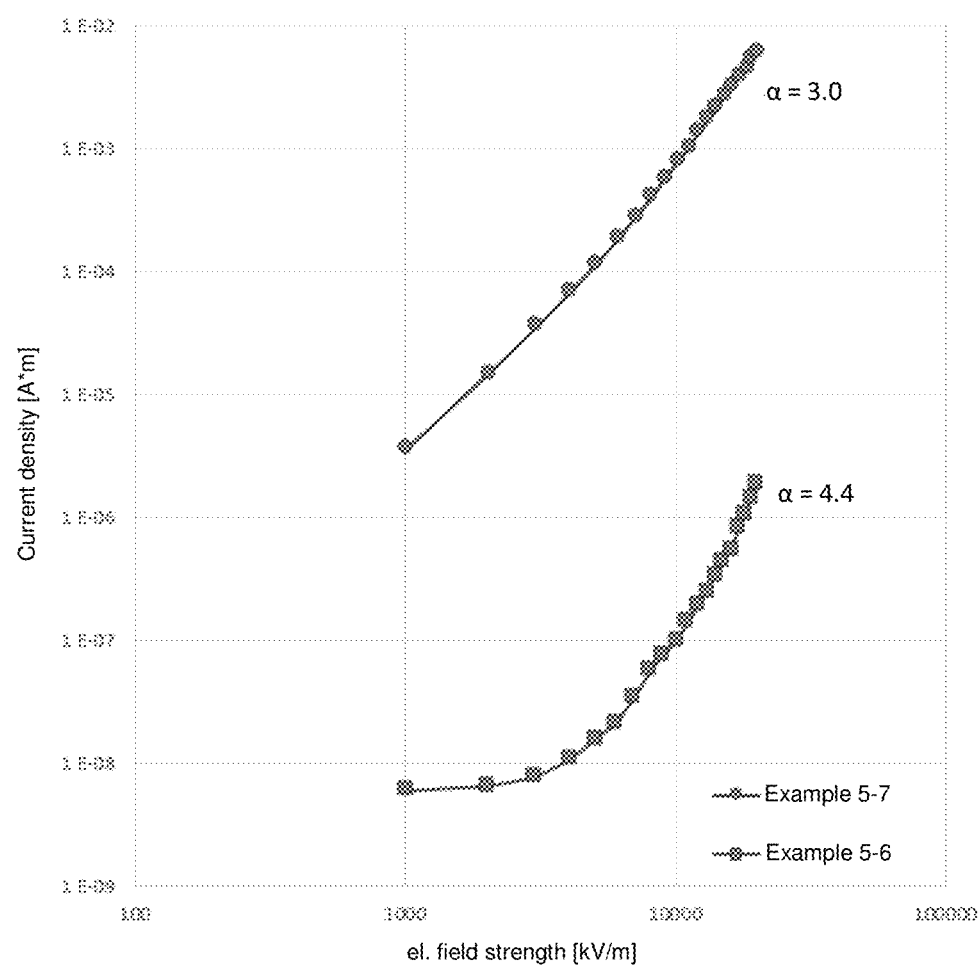

FIG. 3: shows the characteristic DC field strength/current density curve (E/J) of the filler in accordance with Example 2 in the pigment mass concentrations 25 and 50.8% in RTV-2 silicone (Examples 5-6 and 5-7).

Figure 4:
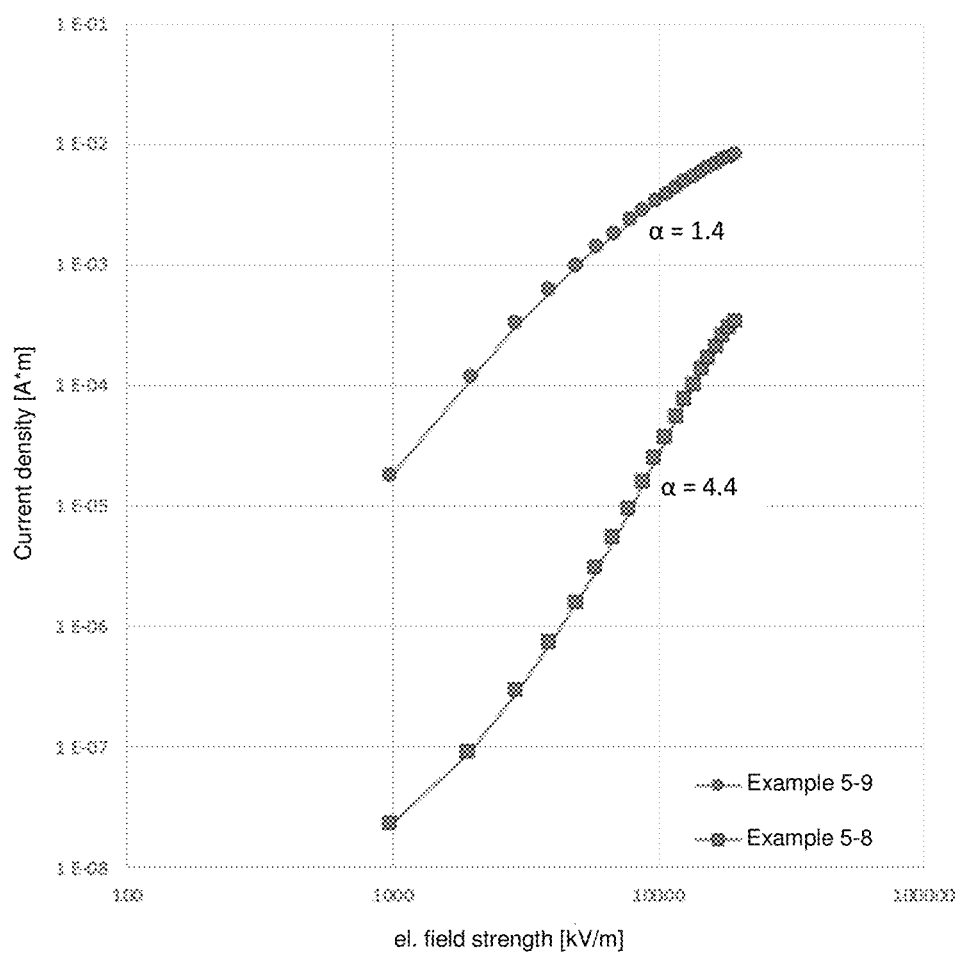

FIG. 4: shows the characteristic DC field strength/current density curve (E/J) of the filler in accordance with Example 3 in the pigment mass concentrations 25 and 37% in RTV-2 silicone (Examples 5-8 and 5-9).

Figure 5:
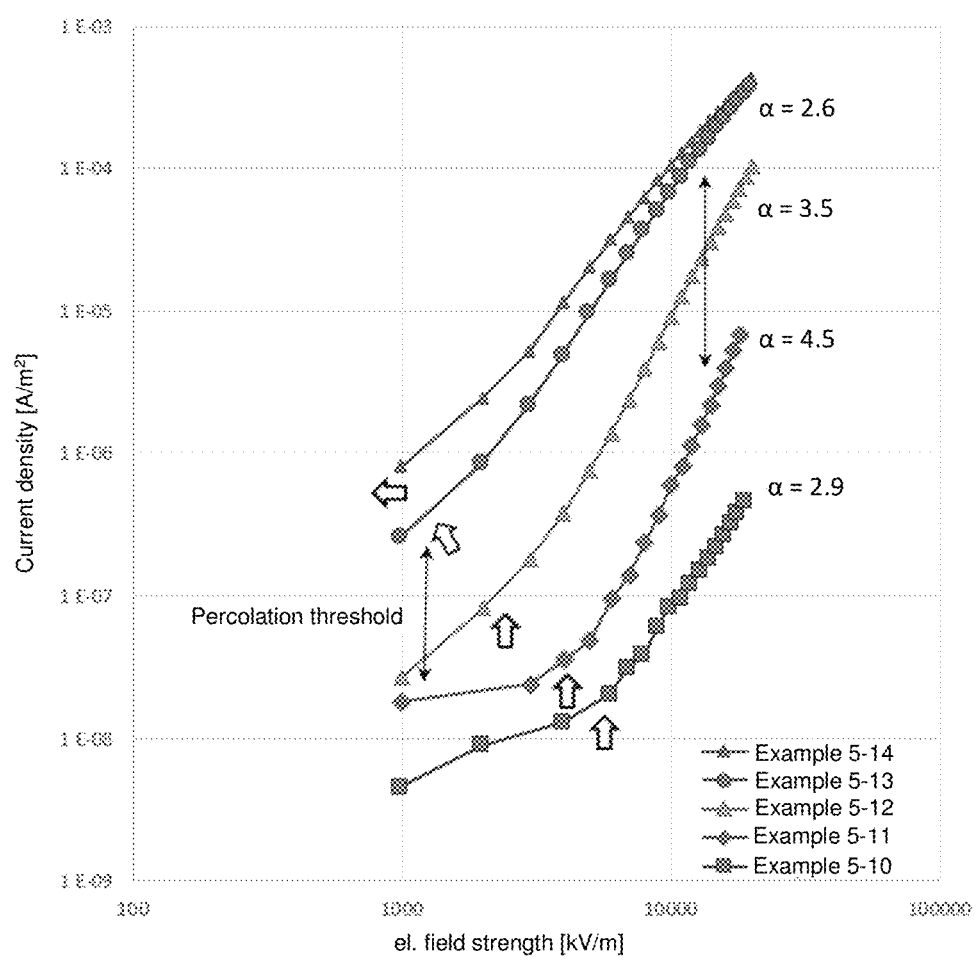

FIG. 5: shows the characteristic DC field strength/current density curve (E/J) of a filler in accordance with Example 4 in RTV-2 silicone with pigment mass concentrations of 15, 20, 25, 30 and 35%. The percolation threshold is between 15 and 30% PMC (Examples 5-10 to 5-14).

Figure 6:
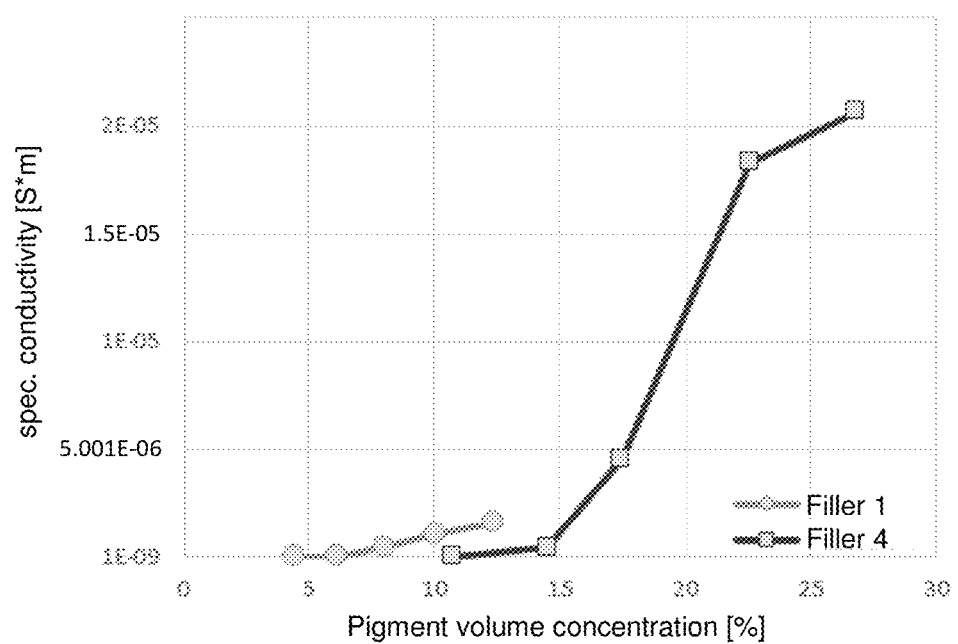

FIG. 6: shows the percolation curves of the fillers in accordance with Examples 1 and 4 in RTV-2 silicone as a function of the pigment volume concentration PVC. The specific conductivity of the samples at a field strength of 20 kV/m is plotted.

Figure 7:
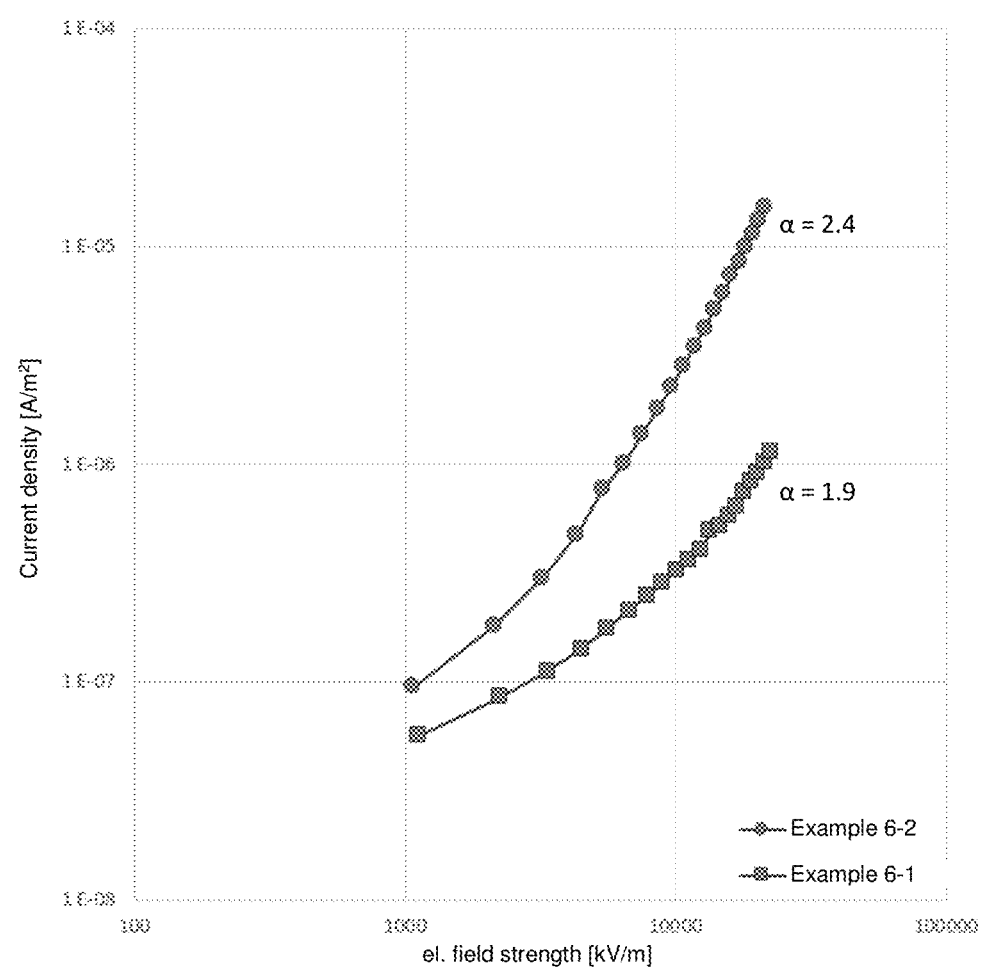

FIG. 7: shows the characteristic DC field strength/current density curve (E/J) of the filler in accordance with Example 1 in the pigment mass concentrations 25 and 35% in LSR silicone (Examples 6-1 and 6-2).

Figure 8:
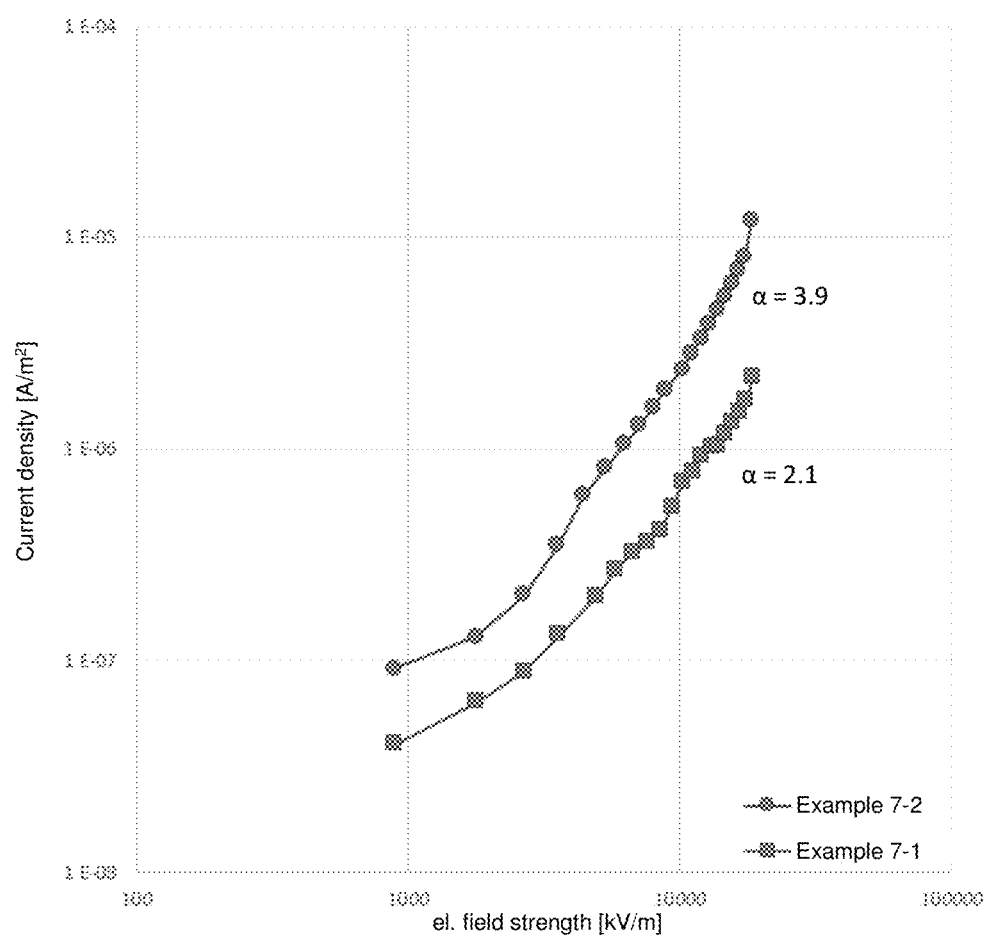

FIG. 8: shows the characteristic DC field strength/current density curve (E/J) of the filler in accordance with Example 4 in the pigment mass concentrations 20 and 35% in epoxide (Examples 7-1 and 7-2).

Figure 9:
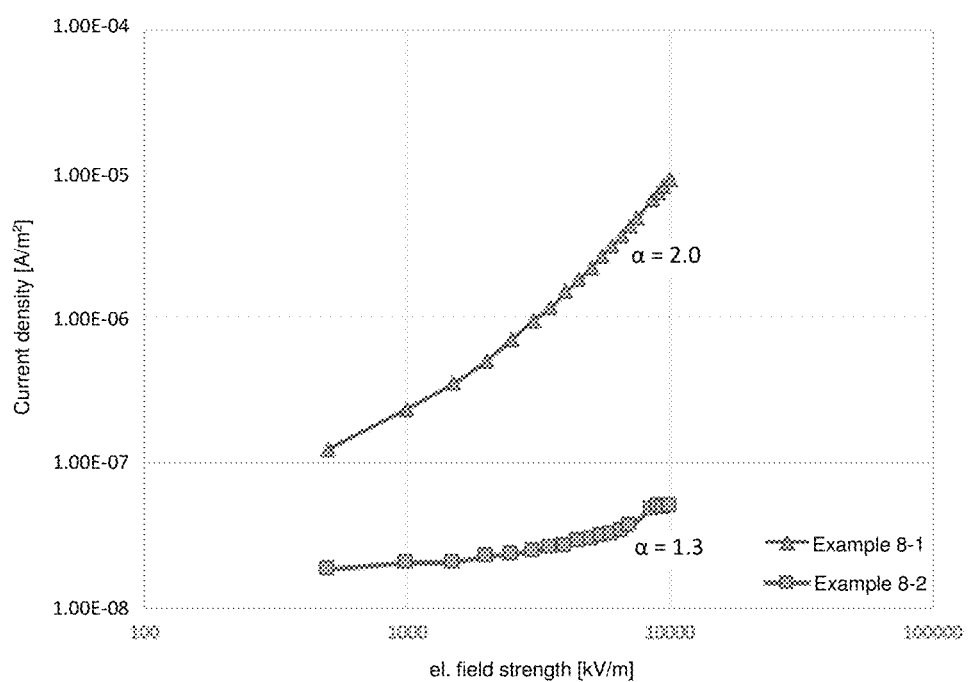

FIG. 9: shows the characteristic DC field strength/current density curve (E/J) of the filler in accordance with Example 1 in HD-PE in the concentrations 30 and 40% by weight (Examples 8-1 and 8-2).

Figure 10:
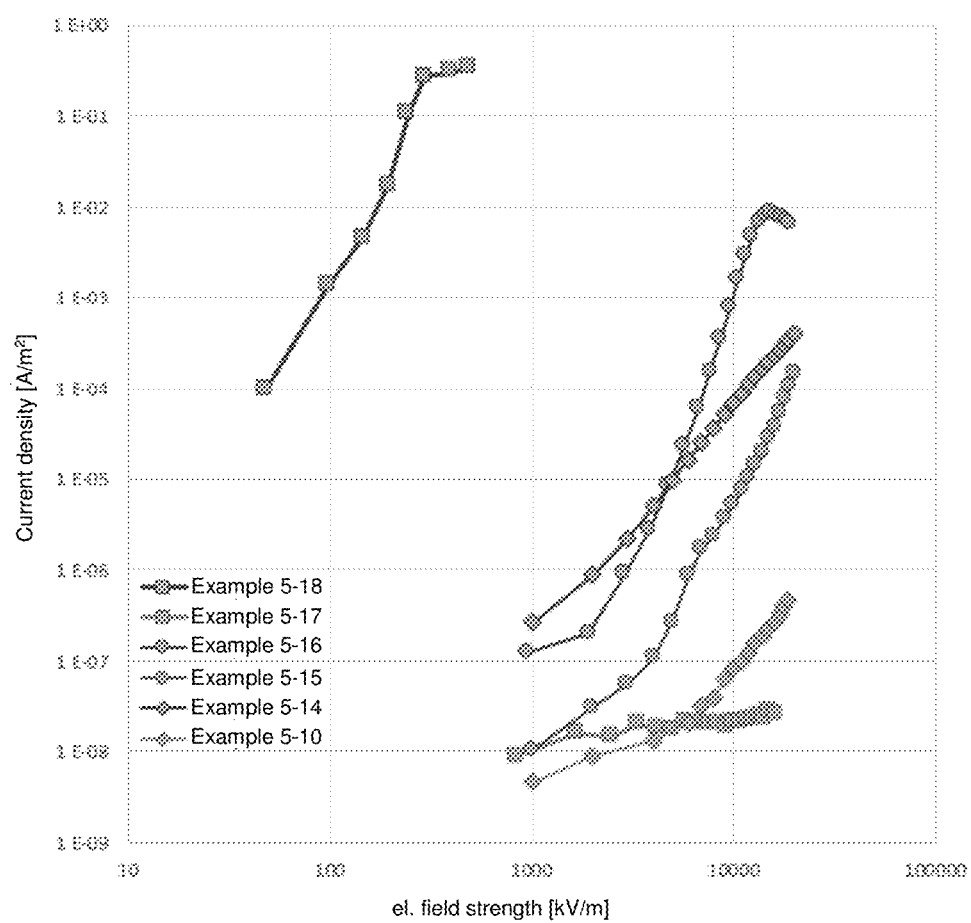

FIG. 10: shows the characteristic DC field strength/current density curve (E/J) of the test specimens in accordance with Examples 5-10 to 5-18 (Table 3) in RTV-2 silicone. Test specimens 5-10, 5-15 and 5-17 have a PMC of 25%, test specimens %-14, 5-16 and 5-18 have a PVC of about 27%.

Figure 11:
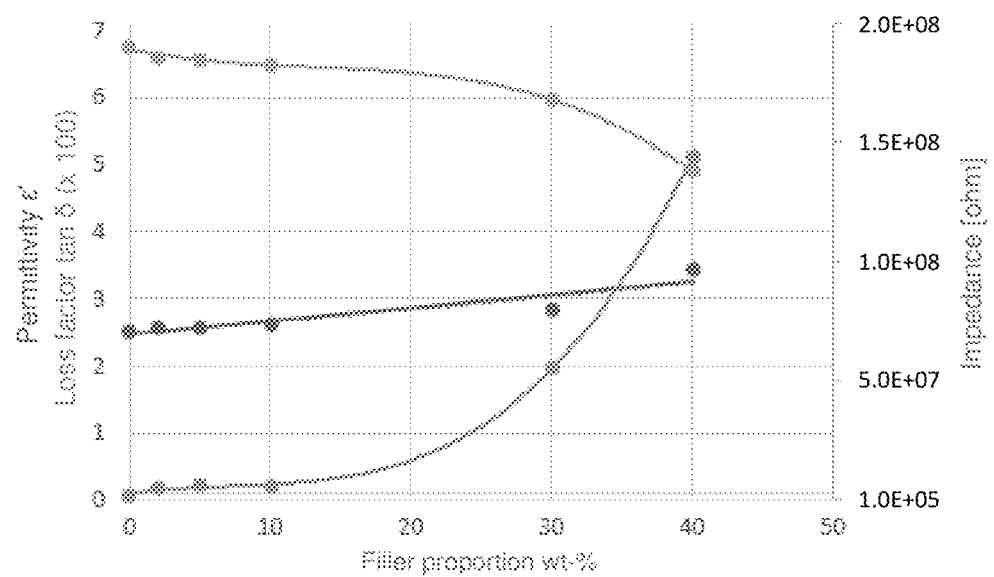

FIG. 11: shows the change in impedance Z, permittivity ε' and loss factor tan δ(×100) at an alternating voltage of 50 Hz of the filler in accordance with Example 1 in HDPE with various filler concentrations (0 to 40% by weight).

Figure 12:
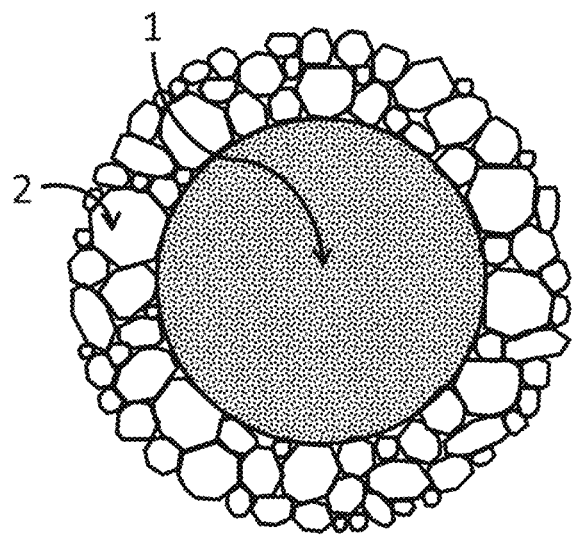
Figure 12:
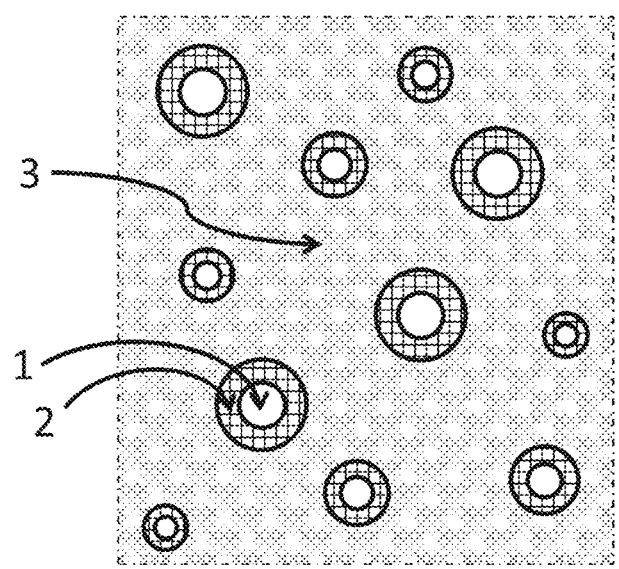

FIG. 12: shows a) a diagrammatic representation of the particulate fillers in accordance with the present invention with dielectric support particle (1) and a granular, nonlinear electrically conductive coating (2) and b) a diagrammatic representation of a polymer matrix (3) filled with the fillers according to the invention.

The invention is intended to be described below with reference to examples, but is not intended to be restricted thereto.

EXAMPLES

Preparation of Particulate Fillers

Example 1

100 g of aluminium oxide flakes (BET 3.3 m²/g, density 3.75 g/cm³, particle size 5-40 μm) are suspended in about 2 l of deionised water. A solution of 700 g of titanium oxychloride (400 g/l), 3.3 g of niobium pentachloride in 24 ml of hydrochloric acid (37%) and 0.8 g of manganese sulfate monohydrate is added dropwise to the suspension at 75° C. with stirring in an acidic medium. The pH of 2 is kept constant by simultaneous regulated metered addition of sodium hydroxide solution. When all the solution has been added, the mixture is stirred at 75° C. for a further 15 min, before a solution of 13.5 g of cerium chloride heptahydrate in 150 ml of deionised water is added uniformly and with metered addition of sodium hydroxide solution at a constant pH of 7. The mixture is subsequently cooled to room temperature with stirring, and the reaction mixture is neutralised again. The pigment obtained is filtered off via a suction filter, washed with water, dried at 140° C. and calcined at 1100° C. for 120 min., giving a pale, ochre-coloured pigment powder. The pigment particles obtained have aluminium oxide flakes (particle size <15 µm) as support particles and a coating comprising niobium-, manganese- and cerium-doped titanium dioxide adherently precipitated onto the latter.

Example 2

100 g of spherical aluminium oxide particles (BET 1.4 m$^2$/g, density 2.85 g/cm$^3$, particle size $d_5$-$d_{95}$=14 µm-45 µm) are suspended in about 2 l of deionised water. A solution of 577 g of titanium oxychloride (400 g/l), 5.04 g of niobium pentachloride in 24 ml of hydrochloric acid (37%) and 0.16 g of manganese sulfate monohydrate is added dropwise to the suspension at 90° C. with stirring in an acidic medium. The pH of 2 is kept constant by simultaneous regulated metered addition of sodium hydroxide solution. When all the solution has been added, the mixture is stirred at 90° C. for a further 15 min, before a solution of 7.6 g of cerium chloride heptahydrate in 150 ml of deionised water is added uniformly and with metered addition of sodium hydroxide solution at a constant pH of 7. The mixture is subsequently cooled to room temperature with stirring, and the reaction mixture is neutralised again. The pigment obtained is filtered off via a suction filter, washed with water, dried at 140° C. and calcined at 1100° C. for 120 min., giving an ochre-coloured pigment powder. The pigment particles obtained have hollow aluminium oxide spheres (particle size <70 µm) as support particles and a coating comprising niobium-, manganese- and cerium-doped titanium dioxide adherently precipitated onto the latter.

Example 3

100 g of spherical aluminosilicate particles (BET 1.4 m$^2$/g, density 0.87 g/cm$^3$, particle size $d_5$-$d_{95}$=5 µm-63 µm) are suspended in about 2 l of deionised water. A solution of 577 g of titanium oxychloride (400 g/l), 5.04 g of niobium pentachloride in 24 ml of hydrochloric acid (37%) and 0.16 g of manganese sulfate monohydrate is added dropwise to the suspension at 90° C. with stirring in an acidic medium. The pH of 2 is kept constant by simultaneous regulated metered addition of sodium hydroxide solution. When all the solution has been added, the mixture is stirred at 90° C. for a further 15 min, before a solution of 7.6 g of cerium chloride heptahydrate in 150 ml of deionised water is added uniformly and with metered addition of sodium hydroxide solution at a constant pH of 7. The mixture is subsequently cooled to room temperature with stirring, and the reaction mixture is neutralised again. The pigment obtained is filtered off via a suction filter, washed with water, dried at 140° C. and calcined at 1100° C. for 120 min., giving an ochre-coloured pigment powder. The pigment particles obtained have hollow aluminosilicate spheres (particle size<100 µm) as support particles and a coating comprising niobium-, manganese- and cerium-doped titanium dioxide adherently precipitated onto the latter.

Example 4

The filler is prepared analogously to Example 3, with the change that, besides 2.5 g of niobium pentachloride (as 12.5% solution in HCl), only 0.35 g of chromium trichloride is added in 598 g of titanium oxychloride solution. A virtually white pigment powder is obtained. The pigment particles obtained have hollow aluminosilicate spheres (particle size<100 µm) as support particles and a coating comprising niobium- and chromium-doped titanium dioxide adherently precipitated onto the latter.

Table 1 shows the composition of the particulate fillers according to the invention from Examples 1 to 4. The doping of the TiO$_2$ coating is indicated in atom-% in the titanium dioxide.

TABLE 1

| Example | Support | wt.-% of support | wt.-% of TiO$_2$ | at-% of Nb | at-% of Mn | at-% of Cr | at-% of Ce |
|---|---|---|---|---|---|---|---|
| 1 | Al2O3 flakes | 50 | 50 | 0.5 | 0.05 | — | 1.2 |
| 2 | Al2O3 hollow spheres | 44 | 56 | 1 | 0.05 | — | 1.1 |
| 3 | Aluminosilicate hollow spheres | 40 | 60 | 1 | 0.05 | — | 1.1 |
| 4 | Aluminosilicate hollow spheres | 40 | 60 | 0.05 | — | 0.05 | — |

Table 2 shows the density and size distribution of the particulate fillers in accordance with Examples 1 to 4.

TABLE 2

| Example | Density [g/cm$^3$] | $d_5$ [µm] | $d_{50}$ [µm] | $d_{90}$ [µm] |
|---|---|---|---|---|
| 1 | 3.94 | 7.9 | 18.5 | 32.5 |
| 2 | 2.87 | 2.4 | 6.6 | 59.9 |
| 3 | 1.61 | 7.6 | 30.8 | 54.2 |
| 4 | 1.50 | 7.1 | 30.7 | 53.3 |

Example 5

Production of Test Specimens from Room-Temperature-Crosslinking Silicone

The amounts indicated in Table 3 of core/shell particles from Examples 1 to 4 and the comparative materials α-SiC (Alfa Aesar Art. #40155, density 3.51 g/cm$^3$) and the ZnO microvaristor powder (ABB/Switzerland, density 5.22 g/cm$^3$) are roughly premixed in a can with the respective proportions of component A of a commercial room-temperature-crosslinking silicone resin RTV-2 (manufacturer's material data: A:B=9:1, viscosity of the mixture 3500 mPa*s at 23° C., Shore A hardness 45°) and homogenised for at least 2 minutes in a vacuum SpeedMixer (Hauschild) at a reduced pressure of 4 mbar and 1600 revolutions per minute. The respective amounts of component B of the same RTV2 silicone resin are subsequently added, the components are again roughly premixed and homogenised in the vacuum SpeedMixer for at least 1 minute at 4 mbar and 1600 revolutions per minute. The viscous material is then poured rapidly, while observing the pot life, into a mould, which determines the geometrical dimensions of the test specimen. The silicone resin is cured in the mould for at least 30 minutes at 70° C. After the mould has cooled, the mould is opened and the test specimen is removed and stored under dust-free conditions. The layer thicknesses of the cross-linked test specimens are between 500 μm and 600 μm and are determined at various points for each of the circular test specimens (diameter 60 mm) as the average of ten measurements using an eddy-current layer thickness measuring instrument (Fischer Dualscope FMP30 with FD10 sensor in accordance with Din EN ISO 2360). The test specimens for Examples 5-17 and 5-18 can only be produced with difficulty, even in small amounts, since sedimentation already commences during preparation in the SpeedMixer can, leading to uneven distribution of the fillers in the test specimen.

TABLE 3

RTV-2 silicone test specimens:

| Example | Filler from Example | Filler: RTV-2 (A): RTV-2 (B) (m/m/m) | Degree of filling PMC %/PVC % |
|---|---|---|---|
| 5-1 | 1 | 3.8 g:19.1 g:2.1 g | 15%/4.4% |
| 5-2 | 1 | 5.0 g:18.0 g:2.0 g | 20%/6.1% |
| 5-3 | 1 | 6.3 g:16.9 g:1.9 g | 25%/8.0% |
| 5-4 | 1 | 7.5 g:15.8 g:1.7 g | 30%/10.0% |
| 5-5 | 1 | 8.8 g:14.6 g:1.6 g | 35%/12.3% |
| 5-6 | 2 | 6.3 g:16.9 g:1.9 g | 25%/10.6% |
| 5-7 | 2 | 12.7 g:11.1 g:1.2 g | 58%/26.8% |
| 5-8 | 3 | 6.3 g:16.9 g:1.9 g | 25%/17.4% |
| 5-9 | 3 | 9.2 g:14.3 g:1.6 g | 36.6%/26.8% |
| 5-10 | 4 | 3.8 g:19.1 g:2.1 g | 15%/10.7% |
| 5-11 | 4 | 5.0 g:18 g:2.0 g | 20%/14.5% |
| 5-12 | 4 | 6.3 g:16.9 g:1.9 g | 25%/18.5% |
| 5-13 | 4 | 7.5 g:15.8 g:1.7 g | 30%/22.5% |
| 5-14 | 4 | 8.8 g:14.6 g:1.6 g | 35%/26.0% |
| 5-15 | SiC | 6.3 g:15.0 g:3.8 g | 25%/8.8% |
| 5-16 | SiC | 13.9 g:10.0 g:1.1 g | 53.5%/26.8% |
| 5-17 | ZnO | 6.3 g:16.9 g:1.9 g | 25%/6.1% |
| 5-18 | ZnO | 16.3 g:7.9 g:0.9 g | 65.1%/26.8% |

Example 6

Production of Test Specimens in LSR

The liquid silicone rubber LSR samples are produced analogously to Example 5, but are cured in a polypropylene casting mould in a hot press at 120° C. for 20 min. For LSR, the mixing ratio of components A and B is 1:1 (see Table 4).

TABLE 4

LSR silicone test specimens:

| Example | Filler from Example | Filler: LSR (A):LSR (B) (m/m/m) | Degree of filling PMC %/PVC % |
|---|---|---|---|
| 6-1 | 1 | 4.0 g:8.0 g:8.0 g | 20%/15.0% |
| 6-2 | 1 | 7.0 g:6.5 g:6.5 g | 35%/27.5% |

Example 7

Production of Epoxy Resin Test Specimens

The amounts of fillers from Example 4 indicated in Table 5 are initially introduced in a can with the said proportions of a binder consisting of in each case 4% of benzyl alcohol, 76% of ARALDITE DBF BD and 20% of ARADUR HY 2966, roughly premixed and homogenised successively in a vacuum SpeedMixer (Hauschild) at a reduced pressure of 4 mbar for 2 minutes at 1000 revolutions per minute, 2 minutes at 1800 revolutions per minute and 30 seconds at 800 revolutions per minute. The mixed or homogenised epoxy resin is then poured rapidly into a Teflon casting chamber and cured at 60° C. for about 1 hour. After the sample has cooled, the epoxide plate is removed and the circular test specimen is drilled out. The layer thickness is determined using a dial gauge.

TABLE 5

Epoxide test specimens

| Example | Filler from Example | Composition filler: binder | Degree of filling PMC %/PVC % |
|---|---|---|---|
| 7-1 | 4 | 20 g:80 g | 20%/16.2% |
| 7-2 | 4 | 25 g:75 g | 35%/29.4% |

Example 8

Production of HD-PE Test Specimens

The filler prepared in Example 1 is used to produce a 40% master match in an HDPE (Purell GA 7760) in a DSE Leistritz Micro 27 twin-screw extruder. This is diluted to 30% with further HDPE. 5% and 2% dilutions are produced from a 10% masterbatch. The extrudates are quenched and granulated. 60 mm*90 mm plates with a layer thickness of 1 mm are produced from the granules in an injection-moulding machine, from which test specimens having a diameter of 50 mm are produced using a core drill.

TABLE 6

HD-PE test specimens

| Example | Filler | Composition | Degree of filling wt % |
|---|---|---|---|
| 8-1 | 1 | Ex.1: HDPE 400 g:600 g | 40% |
| 8-2 | 1 | Ex.8-1: HDPE 750 g:250 g | 30% |
| 8-3 | 1 | Ex.1: HDPE 100 g:900 g | 10% |
| 8-4 | 1 | Ex.8-3: HDPE 500 g:500 g | 5% |
| 8-5 | 1 | Ex.8-3: HDPE 200 g:800 g | 2% |

Measurement of the electrical properties of the test specimens:

The nonlinear conductive character of the test specimens arises from a current/voltage measurement which is intended to show the following deviation from ohmic behaviour:

$$U \sim I^\alpha \quad (1)$$

The deviation is described by the nonlinearity exponent α, which has the value 1 in the case of an ohmic resistance.

The current/voltage characteristic of the varistor filler/polymeric test specimen produced is measured using a Heinzinger 10 kV DC voltage source (PNChp 10000-20 ump) and a Kethley pico-ammeter (6514 system electrometer) on a ring electrode in accordance with DIN EN 61340-2-3.

The diagrammatic structure of the measurement apparatus and the test specimen dimensions to be observed are shown by FIG. 1.

In order to standardise the results, the electric field strength E and the current density J are calculated in accordance with formulae (2-4) with the sample and electrode dimensions given in FIG. 1:

$$E = V/h \quad (2)$$

$$J = I/A \quad (3)$$

$$A = (d_1 + g)^2 * \pi/4 \quad (4)$$

$$\alpha = ln(J_2/J_1)/ln(E_2/E_1) \quad (5)$$

V=voltage in volts (V)
I=current strength in amperes (A)
A=effective electrode area (m$^2$)
h=electrode separation (sample thickness): ~0.5 mm
$d_1$-$d_4$=electrode diameters (see FIG. 1)
$d_1$=diameter of central electrode: 25 mm
g=separation of ring electrode from central electrode: 2.5 mm
α=nonlinearity exponent
$J_1$, $J_2$=current density at 2 points of the measurement
$E_1$, $E_2$=electric field strength at 2 points of the measurement The measurements of the current carried out using a step-shaped voltage ramp at room temperature and relative atmospheric humidity between 20% and 30%.

The nonlinearity arises as the slope of the curves in a double-logarithmic plot of the E-J characteristic in accordance with equation (5). In general, only the fraction greater than 5000 kV/m is taken into account for calculation of the nonlinearity exponent α.

Impedance measurements are carried out at 25° C. in a Novocontrol GmbH Alpha-A broadband dielectric spectrometer with PHECOS temperature control between 0.01 Hz and 100 MHz on the PE test specimens from Example 8-1 to 8-5.

FIG. 2, Examples 5-1 to 5-4

The flake-form varistor filler from Example 1 shows clear nonlinear electrical conductivity. At field strengths between 1000 kV/m and 20000 kV/m, this nonlinear character (slope in FIG. 2) increases in a clearly visible manner and the silicone composites reach a nonlinearity exponent α of 2.3 to 3.7 from about 5000 kV/m. In Examples 5-1 to 5-4, the pigment mass concentration PMC of the varistor fillers increases from 15% to 30% in 5% steps. The percolation threshold is evident as a clear separation between the curves of Example 5-2 and Example 5-3. In the field-strength range considered, the curves extend over a current density of about two and a half powers of ten, where the basic conductivity is dependent on the varistor content in the composite. A sample having the pigment volume concentration PVC 26.8% (58.5% PMC) can no longer be produced with the flake-form varistor filler. At such high degrees of filling, flake-form fillers tend to form rheologically unfavourable so-called "house of cards" structures within the polymer matrix.

FIG. 3, Examples 5-6 and 5-7

The spherical varistor filler from Example 2 exhibits an even more pronounced nonlinear electrical conductivity at a degree of filling of 25% PMC from about 5000 kV/m, with a nonlinearity exponent α of 4.4 over about 2 orders of magnitude of the current density. High degrees of filling with a pigment volume concentration of 26.8%, which corresponds to a pigment mass concentration of 50.8% for this filler, lead to a flatter curve course, i.e. a somewhat lower nonlinearity exponent α of 3, but correspondingly higher conductivity (the entire curve is shifted to higher current density)

FIG. 4, Examples 5-8 and 5-9

The spherical varistor filler from Example 3 already exhibits pronounced nonlinear electrical conductivity at a degree of filling of 25% PMC over the entire measurement range over four orders of magnitude of the current density with a nonlinearity exponent α von 4.4. High degrees of filling with a pigment volume concentration of 26.8% lead to a flatter curve course, i.e. a somewhat lower nonlinearity exponent α of 1.4 and higher conductivity.

FIG. 5, Examples 5-10 to 5-14

The spherical varistor filler from Example 4 exhibits clear nonlinear electrical conductivity. The switching point (denoted by an arrow ⇧ in FIG. 5), at which the nonlinear character of the example composites sets in, moves to lower electric field strengths with higher degree of filling. In Example 5-10 with a degree of filling of 15% PMC, this switching point is at about 6000 kV/m. The switching point already occurs at 4000 kV/m in the case of Example 5-11 with 20% PMC and at about 2000 kV/m in the case of Example 5-12 with 25% PMC. In the case of Example 5-13 with 30% PMC, the curvature range is apparently just recorded at the beginning of the measurement with 1000 kV/m and in the case of Example 5-14 with 35% PMC, it is below this measurement limit. The curve of the material from Example 5-11 is steepest just before the percolation threshold with a nonlinearity exponent α of 4.5. Here too, the conductivity of the materials increases with increasing degree of filling and the curves of the examples shift to higher current densities.

FIG. 6:

The percolation effect is much more pronounced in the case of composites with the spherical materials of low density from Example 4 than in the case of those with flake-form materials of high density from Example 1 (FIG. 6). For the same weight introduced (PMC 15%-35% for composites with Example 1 and Example 4 in RTV-2 silicone), these varistor fillers achieve significantly higher volume filling (PVC in RTV-2 silicone: 4.4%-12.3% with Example 1 and 10.7%-26.8% with Example 4).

FIGS. 7 to 9:

The materials produced in Examples 1 to 4 can be converted into field-controlling insulating materials in a very wide variety of polymer matrices. This is evident from the nonlinear electrically conductive character of these composites. The curves shown in FIG. 7 show this characteristic of the varistor filler from Example 1 in a more highly cross-linked LSR silicone (Examples 6-1 and 6-2) and FIG. 8 shows curves with nonlinear electrical conductivity of the varistor filler from Example 4 in an epoxide composite (Examples 7-1 and 7-2). The electrically conductive behaviour arises analogously to the composites shown so far. Besides these two-component systems, FIG. 9 shows the nonlinear electrical properties of a composite with an HD-PE produced by extrusion with the particles directly (Example 8-1) or from a masterbatch (Example 8-2).

FIG. 10:

FIG. 10 draws the comparison between the varistor fillers according to the invention (here Example 4 in the formulations from Example 5-10 and 5-14) and other field-controlling materials. To this end, a silicon carbide (Example 5-15/5-16) and a zinc oxide microvaristor (Example 5-17/5-18) is selected. For better comparability, on the one hand a formulation is prepared which in each case corresponds to a pigment mass concentration of 25% PMC (Examples 5-10, 5-15 and 5-17) and a further formulation with a high concentration in the same volume filling of 26.8% PVC (Example 5-14, 5-16 and 5-18).

The curve of the varistor filler from Example 5-15 crosses over the curve of silicon carbide from Example 5-16. Depending on the concentration, however, it is also possible to establish lower conductivities in the insulating material than with silicon carbide, as shown by the comparison of the curves from Examples 5-10 (varistor filler) and 5-15 (silicon carbide). By contrast, it becomes clear with the curve of Examples 5-17 and 5-18 filled with zinc oxide microvaristor that this material is difficult to control. Either it exhibits only low nonlinearity with low filling (Example 5-17) or it is clearly too conductive in the case of high filling (Example 5-18). The switching point to the nonlinearly conductive region is then at very low electric field strengths (<<100 kV/m).

FIG. 11:

The dielectric measurements on an impedance spectrometer also allow the properties of the varistor fillers according to the invention to be determined in an alternating-current environment. FIG. 11 shows the impedance (alternating current resistance) Z and the permittivity $\varepsilon'$ and the loss factor tan $\delta$ of the composites comprising the varistor filler from Example 1 and an HD-PE, in the formulations from Examples 8-1 to 8-5, at 50 Hz. The permittivity $\varepsilon'$ increases only slowly with the filler proportion (as average of the proportions of polyethylene and the doped varistor filler). By contrast, the impedance, but also the loss factor, suggest the shape of a classical percolation curve with its step from a filler proportion of about 25%. Permittivity and loss factor are still very small. For pure HDPE, the literature indicates a value of about 2.4 for the permittivity and of $2*10^{-4}$ for the loss factor. However, the measured loss factor for the unfilled HDPE is already $4*10^{-2}$ and is only exceeded by a factor of ten at a degree of filling of 37% by weight of varistor filler.

The invention claimed is:

1. A particulate filler which consists of support particles and a coating in each case surrounding the support particles, wherein the support particles comprise at least one aluminium compound or silicon compound and the coating comprises a titanium dioxide doped with niobium and at least one further element, which at least one further element is Mn, Cr and/or Ce.

2. The particulate filler according to claim 1, wherein the support particles comprise aluminium oxide, silicon dioxide or an aluminosilicate.

3. The particulate filler according to claim 1, wherein the support particles consist of aluminium oxide, silicon dioxide, mullite, fly ash, kaolinite, pumice stone or perlite.

4. The particulate filler according to claim 1, wherein the support particles are in flake form, are spherical or have an isotropically irregular shape.

5. The particulate filler according to claim 1, which has a density of 1.5 to 4.5 g/cm$^3$.

6. The particulate filler according to claim 1, wherein, besides niobium, the titanium dioxide is doped with at least two further elements of Mn, Cr and/or Ce.

7. The particulate filler according to claim 1 wherein the doping is present in the titanium dioxide in an amount of 0.01 to 5 atom-%.

8. The particulate filler according to claim 1, which has an average particle size of 1 to 150 µm.

9. The particulate filler according to claim 1, wherein the coating is in granular form on the support particles.

10. A process for preparing a particulate filler according to claim 1, comprising providing the coating on the support particles, which support particles comprise at least one aluminium compound or silicon compound and which coating comprises at least one titanium compound, at least one niobium compound and at least one Mn, Cr and/or Ce compound in an aqueous suspension, and in wherein the support particles provided with the coating are subsequently dried and calcined, during which the coating is converted into a titanium dioxide in granular form which is doped with niobium and at least one further element, which at least one further element is Mn, Cr and/or Ce.

11. The process according to claim 10, wherein the support particles are in flake form, are spherical or have an isotropically irregular shape and comprise aluminium oxide, silicon dioxide or an aluminosilicate.

12. The process according to claim 10, wherein the support particles consist of aluminium oxide, silicon dioxide, mullite, fly ash, kaolinite, pumice stone or perlite.

13. A moulding or coating composition pigmented by a particulate filler according to claim 1.

14. The melding moulding or coating composition according to claim 13, wherein the moulding or coating composition comprises silicones, EPDM, polyurethanes, polyethylenes, epoxides, phenolic resins and/or a ceramic material.

15. The moulding or coating composition according to claim 13, wherein the particulate filler is present in the moulding or coating composition with a pigment volume concentration of 3-33% by vol., based on the volume of the moulding or coating composition.

16. The moulding or coating composition according to claim 13, wherein the particulate filler has nonlinear electrical properties in the moulding or coating composition.

17. The particulate filler according to claim 1, wherein the titanium dioxide is doped with one of the following combinations (a) Nb, Mn; (b) Nb, Mn, Cr; (c) Nb, Mn, Ce; (d) Nb, Cr; (e) Nb, Cr, Ce; (f) Nb, Ce; or (g) Nb, Mn, Cr, Ce.

18. The particulate filler according to claim 1, wherein the support particles consist of at least one aluminium compound or silicon compound.

19. The particulate filler according to claim 1, wherein the support particles consist of aluminium oxide, silicon dioxide or an aluminosilicate.

20. The particulate filler according to claim 1, wherein the titanium dioxide is doped with niobium and at least one further element, which at least one further element is Mn and/or Ce.

* * * * *